United States Patent [19]

Bucciero

[11] Patent Number: 5,083,347
[45] Date of Patent: Jan. 28, 1992

[54] SELF-COMPENSATING HOSE CLAMP

[76] Inventor: Henry R. Bucciero, 19928 Fleetwood, Harper Woods, Mich. 48225

[21] Appl. No.: 548,137

[22] Filed: Jul. 5, 1990

[51] Int. Cl.$^5$ ............................................. B65D 63/10
[52] U.S. Cl. ...................................... 24/27; 24/20 S; 24/20 CW
[58] Field of Search .......... 24/27, 20 R, 20 S, 20 EE, 24/20 CW, 20 LS, 20 TT, 22, 23 W, 23 EE

[56] References Cited

U.S. PATENT DOCUMENTS

| | | | |
|---|---|---|---|
| 1,277,076 | 8/1918 | Ireland | 24/20 CW |
| 1,277,077 | 8/1918 | Ireland | 24/27 |
| 1,379,476 | 5/1921 | Parr | 24/20 CW |
| 2,285,850 | 6/1942 | Weeks | 24/20 S |
| 3,208,120 | 9/1965 | Kliss | 24/27 |
| 3,417,437 | 12/1968 | Binnall et al. | 24/27 |
| 3,475,793 | 11/1969 | Oetiker | 24/20 CW |
| 4,041,931 | 8/1977 | Elliott et al. | 24/27 |
| 4,107,824 | 8/1978 | Lussier | 24/27 |

*Primary Examiner*—Victor N. Sakran
*Attorney, Agent, or Firm*—Krass & Young

[57] ABSTRACT

A self-compensating hose clamp made of a single piece of wire has a primary loop having a substantially circular configuration and of a sufficient dimension to engage a hose for clamping purposes. At least one intermediate loop is formed exteriorly of the primary loop to provide overall flexibility to the clamp for installation and removal purposes.

17 Claims, 1 Drawing Sheet

SELF-COMPENSATING HOSE CLAMP

FIELD OF THE INVENTION

This invention relates to self-compensating hose clamps formed from spring wire.

BACKGROUND OF THE INVENTION

Internal combustion engines, such as those used in automobiles, typically include sections of flexible hose to convey fluids. These hoses are generally composed of rubber and/or synthetic polymers and must function in an environment susceptible to wide variations in temperature. The temperature of the engine compartment prior to engine operation may be at ambient temperature but, in use, the engine quickly achieves an operating temperature of several hundred degrees. Due to these temperature changes the tubular connections experience diametral and flexibility changes. Clamps used to secure the hose connections must accommodate these changes.

Various types of clamps have been used to secure such hoses to their associated components in such applications as internal combustion engines among others. Fixed diameter clamps do not adjust to changes in the clamped connection caused by the variations in temperature. Spring-type members have been added to fixed diameter clamps to compensate for changes due to temperature, but are inefficient and quite expensive.

Spring-type, single wire hose clamps compensate to a certain extent for diametral and material changes caused by variations in temperature. These hose clamps are typically formed into spiral loops from annealed spring wire and then are hardened and tempered. Opposed forces imposed on the ends of the wire allow the loop to be expanded against the tension of the spring wire for installation on a hose. Upon release, the loop contracts and clamps the hose. The clamp itself is configured with an unstressed loop diameter smaller than the associated hose, so that upon installation the clamp provides sufficient gripping force for a fluid-tight seal. As the hose expands during engine operation, the clamp resiliently expands and maintains a relatively constant clamping force on the hose connection. Examples of these single wire hose clamps can be found in U.S. Pat. No. 3,208,120, U.S. Pat. No. 2,180,271, U.S. Pat. No. 3,317,966, and U.S. Pat. No. 2,793,414.

These clamps must be relatively rigid so that they impose a sufficient force on the connections to achieve an effective seal. This rigidity limits the size to which the loop may be enlarged during installation without exceeding the elastic limit of the wire. The engineering compromise between the clamping forces that the spring imposes during normal use and the limit to which the clamp may be opened during installation without taking a permanent set is aggravated by the fact that the stresses imposed on the clamp during installation are concentrated at a point midway between the spring ends.

There is accordingly a need in the industry for a self-compensating hose clamp which compensates for diametral and material changes of the components due to temperature variations and which is both inexpensive and has a large diametral flexibility range for efficient installation and removal purposes.

SUMMARY OF THE INVENTION

The present invention solves the problem of providing a simple self-compensating hose clamp which can be widely opened for installation purposes without imposing a permanent set on the spring, yet is sufficiently rigid to provide effective clamping forces in use, through a novel clamp configuration formed of a single piece of spring wire bent to provide a large primary loop which engages the hose and at least one secondary (or intermediate) reversely bent loop which is substantially smaller than the primary loop and is formed substantially in the plane of the primary loop but exteriorly of the primary loop, intermediate to the free ends of the wire. When the clamp is forced open for installation the resulting stresses are imposed primarily over the length of the secondary loop. Because of this stress distribution the clamp can be formed with sufficient rigidity to impose the required clamping force during use without unduly limiting the degree to which the clamp may be opened during installation before acquiring a permanent set.

In a preferred embodiment of the invention, which is subsequently disclosed in detail, a single secondary loop is formed midway between the ends of the spring. In alternative embodiments more than a single intermediate loop is provided, spreading stresses imposed during opening between the loops and extending the degree to which the clamp may be open during installation. These multiple loops are spaced at regular intervals along the primary loop.

The secondary loops are preferably but not necessarily non-circular with their ends which connect with the primary loop being relatively flattened so that the crossed ends extend in an overlying relationship to one another and generally tangentially to the main loop at that point. This assures that the clamping forces will be exerted relatively uniformly along the entire perimeter of the primary loop.

Considering the preferred embodiment with its single secondary loop, the two sections of the primary loop on opposite sides of the secondary loop preferably lie in longitudinally spaced parallel planes and the lateral transition between these planes occurs in the secondary loop.

The spring wire forming the clamp of the present invention is preferably rectangular in cross section with a short end of the rectangle lying against the hose. This spreads the clamping forces relative to a loop formed of circular configuration to minimize the likelihood of tearing the hose.

BRIEF DESCRIPTION OF THE DRAWINGS

With these and other advantages in view, the invention consists of certain novel features as will be hereinafter fully described and in which the separate parts are designated by the reference char in each of the views. Further, in which.

DETAILED DESCRIPTION OF THE PREFERRED EMBODIMENT

Figure 1:
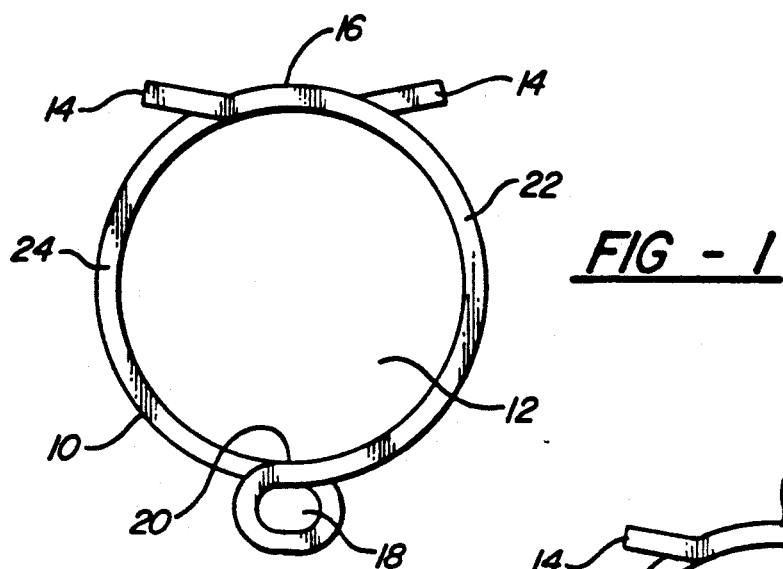
FIG. 1 is a plan view of a first embodiment of the invention.
Figure 4:
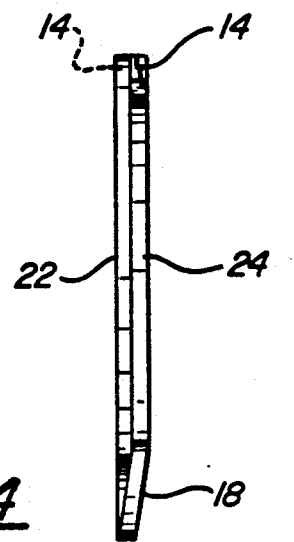
FIG. 4 is a side view of the first embodiment of the invention.

With reference to first to FIGS. 1 and 4, a first embodiment of the present invention provides for a self-compensating hose clamp 10 formed of an elongated spring wire of a rectangular configuration having a primary loop 12 of substantially circular configuration. The free ends 14 of the wire overlap one another in a substantially contiguous relationship at overlap point 16, and extend outward beyond the primary loop 12. This allows for opposed forces to be imposed on the free ends 14 to cause the interior diameter of the primary loop 12 to enlarge. Other forms of end configurations may be employed with alternative embodiments of the invention. The clamp 10 is installed on a hose while the opposed forces keep the primary loop 12 enlarged. After the clamp 10 is positioned, the forces are released and the primary loop tends to constrict to its original size and shape thus clamping the hose. The primary loop 12 has a suitable diameter to engage a selected hose and provide the required clamping force. For example, a clamp 10 designed to fit a one and five-eighths inch hose may have a free state inner diameter of approximately one and seven-sixteenths inches.

The force imposed on the free ends 14 can be applied in one of several ways. The free ends can be manually deflected through the use of a tool, such as a pliers, which mechanically engages the ends and transmits the required force thereto. Alternatively, the clamp 10 can be supplied with a retaining clip engaging the free ends 14 and retaining them in a compressed configuration. The retaining clip holds the clamp 10 in its enlarged position, and upon installation, is removed to allow the clamp 10 to return toward its natural configuration.

A reversely formed intermediate loop 18 is formed in the wire exteriorly of the primary loop 12. This provides greater flexibility to the clamp 10 as forces are imposed on the free ends for installation or removal. The preferred arrangement of the intermediate loop 18 will be disclosed hereinafter.

The substantially circular configuration of the primary loop 12 is maintained to provide 360 degrees of contact between the clamp 10 and the hose. The free ends 14 of the wire overlap one another in a substantially contiguous relationship at overlap point 16. Preferably the intermediate loop 18 is generally elliptical. The sections of the wire connecting the intermediate loop 18 to the primary loop 12 overlap one another in a substantially contiguous relationship, substantially tangentially to the primary loop at that point, at overlap point 20. In this manner, continuous contact is made between the clamp 10 and the hose and a suitable clamping force is distributed about the entire periphery of the hose. No gaps result due to the overlap areas.

In a clamp lacking an intermediate loop 18, opposed forces imposed on the free ends of the wire cause the interior diameter of a primary loop to enlarge while concentrating the resulting stresses at a point intermediate the ends of the clamp. The applied forces are limited by the amount of force the wire can take at a single, narrow location without taking a permanent set. Thus, the amount of flexing such a clamp can accommodate during installation or removal is dependent on the physical characteristics of the wire material at said location.

In the present invention, such stresses are distributed throughout the intermediate loop 18. This provides an extended range of resilience to the clamp 10 as compared to a clamp without an intermediate loop 18. The invention distributes the forces about the intermediate loop 18 preventing an inordinate amount of strain from being placed on any particular point of the wire. Thus, the clamp 10 can achieve an extended range of resilience for installation purposes without taking a set or otherwise being damaged.

With reference particularly to FIG. 4, the primary loop 12 of the preferred embodiment is formed by a pair of semi-circular wire sections 22, 24. The semi-circular wire sections 22, 24 are disposed in substantially parallel adjacent planes and face toward one another to form the primary loop 12. The intermediate loop 18 provides the lateral transition of the wire between the pair of substantially parallel adjacent planes, and also provides for an extended range of motion between the pair of semi-circular wire sections 22, 24 relative one another. The configuration of the parallel planes also make the clamp highly resistant to twisting when the ends are forced toward one another enabling the use of simple opening tools in lieu of more complex "anti-twist" tools.

The present invention is preferably formed of a single piece of hardened spring wire, typically carbon, alloy, or stainless steel, having a rectangular cross-section. This design places a flat surface on the inward face of the primary loop 12, minimizing the chance of the clamp 10 cutting the hose materials during use. That is to say, the larger dimension of the rectangular is preferably the radial direction of the clamp 10. This provides increased tension in the spring wire for clamping purposes. The clamp 10 can also be formed of a square cross-section material having sufficient tension for the given application while providing a greater clamping surface area.

A variety of other alternate cross-sections can be envisioned which minimize the amount of material used in the clamp 10. These include, but are not limited to, circular or triangular cross-sections. A circular cross-section is sufficient for low pressure applications, wherein the contact point of the wire will not cut the hose. A triangular cross-section disposed to provide a flat interior face in the primary loop 12 would utilize approximately half of the material as would a rectangular cross-section. These embodiments minimize the amount of material necessary in constructing the clamp 10 while providing the necessary clamping force for a given application.

The intermediate loops may be formed of two or more turns rather than a single turn to further distribute the stresses imposed by the opening forces for the primary loop.

Figure 2:
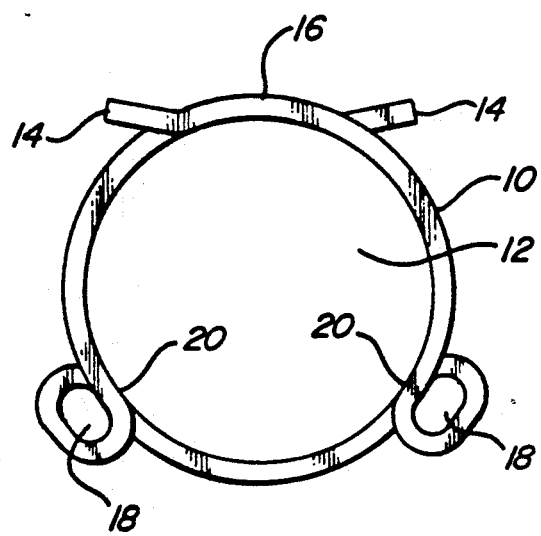
FIG. 2 is a plan view of a second embodiment of the invention.

With reference to FIG. 2, a second preferred embodiment utilizes a plurality of intermediate loops 18. In this embodiment, a clamp 10 is formed of a single piece of wire to provide for a primary loop 12 having a substantially circular configuration. A pair of intermediate loops 18 are formed at approximately 120 degree intervals to provide for enhanced resilience to the clamp 10. The pair of intermediate loops 18 maintain the continuous clamping surface by having overlap sections 20, and are oriented so that the clamp has an extended range of resilience in several directions. This configuration provides for a greater enlargement of the primary loop 12 when opposed forces are imposed on the free ends 14 of the wire.

Figure 3:
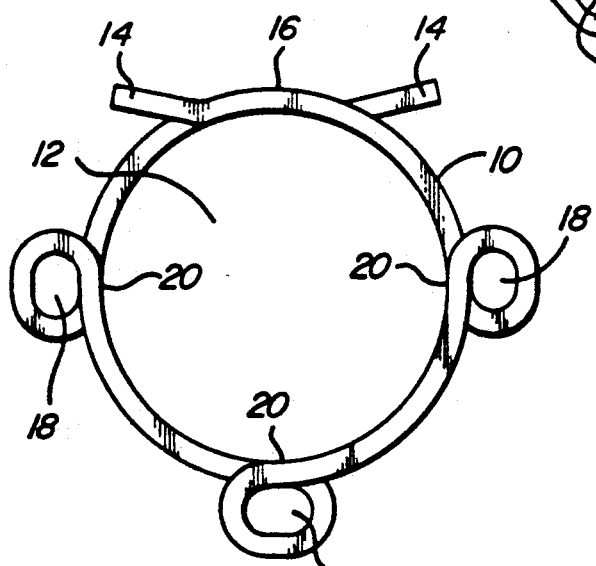
FIG. 3 is a plan view of a third embodiment of the invention.

With reference to FIG. 3, a third preferred embodiment utilizes three intermediate loops 18 to provide further enhanced resilience to the clamp 10. A force imposed on the free ends for opening is distributed about the plurality of intermediate loops allowing a large opening for installation purposes without placing a set in the clamp.

Having thus described my invention, it can be seen that numerous alternative configurations can be envisioned without departing from the spirit of this invention.

I, therefore, claim:

1. A self-compensating clamp for securing a hose about an interiorly extending member formed of a spring wire, comprising:

a primary, hose engaging loop having a substantially circular configuration with sections of the wire proximate the free ends overlapping one another in a substantially contiguous relationship, with the free ends extending beyond the contiguous sections so that opposed forces imposed on the free ends cause the interior diameter of the primary loop to enlarge; and at least one reversely formed intermediate loop, substantially smaller than said primary loop, formed exteriorly of said primary loop with the two sections of wire connecting the intermediate loop to the primary loop overlapping one another in a substantially contiguous relationship so as to maintain the substantially circular configuration of the primary loop, whereby when opposed forces are imposed on the free ends of the wire in a manner tending to open the primary loop, said opposed forces are distributed along the full length of both said primary loop and said at least one intermediate loop providing the clamp with an extended range of resilient deformation for use in positioning said clamp onto said hose as compared to a clamp without said at least one intermediate loop, and, when said opposed forces are released, said clamp provides pressure over a substantially continuous path about the perimeter of said hose to secure said hose onto said interiorly extending member.

2. The invention of claim 1, wherein said at least one reversely formed intermediate loop has a substantially elliptical configuration.

3. The invention of claim 1, wherein said spring wire has a square cross section.

4. The invention of claim 1, wherein said spring wire has a rectangular cross section.

5. The invention of claim 1, wherein said at least one reversely formed intermediate loop consists of a plurality of reversely formed intermediate loops disposed at regular intervals about the exterior of said primary loop.

6. The invention of claim 5, wherein said plurality of reversely formed intermediate loops consists of a pair of reversely formed intermediate loops disposed at approximately 120 degree intervals from each other and the sections of the wire proximate the free ends overlapping one another in a substantially contiguous relationship.

7. The invention of claim 5, wherein said plurality of reversely formed intermediate loops consists of three reversely formed intermediate loops disposed at approximately 90 degree intervals from each other with the sections of the wire proximate the free ends overlapping one another in a substantially contiguous relationship to maintain the circular form of the interior diameter of the primary loop.

8. A self-compensating clamp for securing a hose about an interiorly extending member formed of a spring wire, comprising:

a primary loop formed by a pair of semi-circular wire sections disposed in substantially parallel, adjacent planes, said primary loop having a substantially circular configuration with sections of the wire proximate the free ends overlapping one another in a substantially contiguous relationship, with the free ends beyond the contiguous sections projecting outside of said substantially circular configuration so that opposed forces imposed on the free ends cause the interior diameter of the primary loop to enlarge; and a reversely formed intermediate loop, substantially smaller than said primary loop, formed exteriorly of said primary loop with the two sections of wire connecting the intermediate loop to the primary loop overlapping one another in a substantially contiguous relationship so as to maintain the substantially circular configuration of the primary loop, said intermediate loop providing the longitudinal transition of said wire between said pair of semi-circular wire sections disposed in substantially parallel, adjacent planes forming said primary loop, whereby when opposed forces are imposed on the free ends of the wire in a manner tending to open the primary loop, said opposed forces are distributed along the full length of both said primary loop and said at least one intermediate loop providing the clamp with an extended range of resilient deformation for use in positioning said clamp onto said hose as compared to a clamp without said at least one intermediate loop, and, when said opposed forces are released, said clamp provides pressure over a substantially continuous path about the perimeter of said hose to secure said hose onto said interiorly extending member.

9. The invention of claim 8, wherein said at least one reversely formed intermediate loop has a substantially elliptical configuration.

10. The invention of claim 8, wherein said spring wire has a square cross section.

11. The invention of claim 8, wherein said spring wire has a rectangular cross section.

12. A self-compensating clamp for securing a hose about an interiorly extending member, comprising:

a spring wire having a rectangular cross section;

a primary loop formed in said wire having a substantially circular configuration with sections of the wire proximate the free ends overlapping one another in a substantially contiguous relationship, with the free ends extending beyond the contiguous sections so that opposed forces imposed on the free ends cause the interior diameter of the primary loop to enlarge; and at least one reversely formed intermediate loop formed in said wire, substantially smaller than said primary loop, formed exteriorly of said primary lop with the two sections of wire connecting the intermediate loop to the primary loop overlapping one another in a substantially contiguous relationship so as to maintain the substantially circular configuration of the primary loop, whereby when opposed forces are imposed on the free ends of the wire in a manner tending to open the primary loop, said opposed forces are distributed along the full length of both said primary loop and said at least one intermediate loop providing the clamp with an extended range of resilient deformation for use in positioning said clamp onto said hose as compared to a clamp without said at least one intermediate loop, and, when said opposed forces are released, said clamp provides pressure over a substantially continuous path about the perimeter of said hose to secure said hose onto said interiorly extending member.

13. The invention of claim 12, wherein said at least one reversely formed intermediate loop has a substantially elliptical configuration.

14. The invention of claim 12, wherein said elongated spring wire has a square cross section.

15. The invention of claim 12, wherein said at least one reversely formed intermediate loop consists of a plurality of reversely formed intermediate loops disposed at regular intervals about the exterior of said primary loop.

16. The invention of claim 15, wherein said plurality of reversely formed intermediate loops consists of a pair of reversely formed intermediate loops disposed at approximately 120 degree intervals from each other and the sections of the wire proximate the free ends overlapping one another in a substantially contiguous relationship.

17. The invention of claim 15, wherein said plurality of reversely formed intermediate loops consists of three reversely formed intermediate loops disposed at approximately 90 degree intervals from each other and the sections of the wire proximate the free ends overlapping one another in a substantially contiguous relationship.

* * * * *